US012101224B2

(12) United States Patent
Avegliano et al.

(10) Patent No.: US 12,101,224 B2
(45) Date of Patent: Sep. 24, 2024

(54) DEVICE LIFETIME-AWARE CREATION OF CUSTOMIZABLE SURROGATE-BASED MODELS

(71) Applicant: INTERNATIONAL BUSINESS MACHINES CORPORATION, Armonk, NY (US)

(72) Inventors: Priscilla Barreira Avegliano, Sao Paulo (BR); Emilio Ashton Vital Brazil, Rio de Janeiro (BR); Lucas Correia Villa Real, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/807,534

(22) Filed: Jun. 17, 2022

(65) Prior Publication Data
US 2023/0412454 A1  Dec. 21, 2023

(51) Int. Cl.
*H04L 41/082* (2022.01)
*H04L 41/0859* (2022.01)

(52) U.S. Cl.
CPC ........ *H04L 41/082* (2013.01); *H04L 41/0859* (2013.01)

(58) Field of Classification Search
CPC .......................... H04L 41/082; H04L 41/0859
USPC .................................................. 709/220, 221
See application file for complete search history.

(56) References Cited

U.S. PATENT DOCUMENTS

| 6,292,108 B1 | 9/2001 | Straser |
| 6,499,137 B1 * | 12/2002 | Hunt .................... G06F 9/44521 717/177 |
| 6,983,463 B1 * | 1/2006 | Hunt ....................... H04L 67/10 718/107 |

(Continued)

FOREIGN PATENT DOCUMENTS

| CN | 101364951 B | 12/2010 |
| CN | 102264114 B | 11/2013 |
| WO | 2003015452 A3 | 2/2003 |

OTHER PUBLICATIONS

Benedetto et al., "Towards a practical framework for code offloading in the Internet of Things," Elsevier, Future Generation Computer Systems 92 (2019), https://doi.org/10.1016/j.future.2018.09.056, pp. 424-437.

(Continued)

*Primary Examiner* — Ranodhi Serrao
(74) *Attorney, Agent, or Firm* — Michael O'Keefe

(57) ABSTRACT

According to one embodiment, a method, computer system, and computer program product for adaptive surrogate modeling is provided. The embodiment may include capturing a plurality of system information for a smart Internet of Things (IoT) device. The embodiment may also include calculating a lifespan value of the smart IoT device based on the plurality of captured system information. The embodiment may further include, in response to the calculated lifespan value being below a threshold and a surrogate model fitting one or more parameters of the smart IoT device not existing, creating the surrogate model for the smart IoT device. The embodiment may also include deploying the created surrogate model to the smart IoT device through an update transmission.

17 Claims, 6 Drawing Sheets

(56) References Cited

U.S. PATENT DOCUMENTS

| | | | |
|---|---|---|---|
| 7,693,049 B2 | 4/2010 | Joseph | |
| 9,188,104 B2 | 11/2015 | Bowyer | |
| 9,282,059 B2 | 3/2016 | Vasseur | |
| 9,336,480 B1 | 5/2016 | Owechko | |
| 9,602,349 B2 | 3/2017 | John Archibald | |
| 10,368,283 B2* | 7/2019 | Ji | H04W 36/24 |
| 10,891,366 B1* | 1/2021 | Wu | H04L 9/0894 |
| 11,704,576 B1* | 7/2023 | McEntire | G06F 18/24323 |
| | | | 706/12 |
| 11,704,581 B1* | 7/2023 | McEntire | G06V 20/188 |
| | | | 706/11 |
| 11,715,024 B1* | 8/2023 | McEntire | G06Q 10/04 |
| | | | 706/12 |
| 2002/0147611 A1* | 10/2002 | Greene | H04L 63/102 |
| | | | 707/999.001 |
| 2002/0173984 A1* | 11/2002 | Robertson | H04L 67/34 |
| | | | 709/220 |
| 2002/0178026 A1* | 11/2002 | Robertson | G06Q 10/1093 |
| | | | 709/220 |
| 2003/0050902 A1 | 3/2003 | Buczak | |
| 2007/0112574 A1* | 5/2007 | Greene | H04W 12/03 |
| | | | 709/201 |
| 2009/0187445 A1 | 7/2009 | Barclay | |
| 2009/0254572 A1* | 10/2009 | Redlich | G06Q 10/06 |
| 2010/0250497 A1* | 9/2010 | Redlich | H04L 63/105 |
| | | | 707/661 |
| 2012/0004782 A1 | 1/2012 | Koskan | |
| 2012/0188940 A1* | 7/2012 | Agrawal | H04W 12/084 |
| | | | 370/328 |
| 2012/0317058 A1* | 12/2012 | Abhulimen | G06N 20/00 |
| | | | 706/2 |
| 2013/0096466 A1 | 4/2013 | Sarrafzadeh | |
| 2014/0222996 A1 | 8/2014 | Vasseur | |
| 2015/0351084 A1* | 12/2015 | Werb | H04W 12/08 |
| | | | 370/329 |
| 2016/0173963 A1* | 6/2016 | Filson | G08B 21/10 |
| | | | 340/870.09 |
| 2017/0193395 A1 | 7/2017 | Limonad | |
| 2017/0317946 A1* | 11/2017 | Ji | G06F 15/16 |
| 2018/0025126 A1* | 1/2018 | Barnard | A61B 5/0022 |
| | | | 434/236 |
| 2018/0230780 A1* | 8/2018 | Klenner | E21B 43/121 |
| 2019/0155996 A1* | 5/2019 | Zoldi | G06F 21/6218 |
| 2019/0181641 A1* | 6/2019 | de Hoog | H02J 13/00017 |
| 2019/0205774 A1* | 7/2019 | Ba | G06N 20/20 |
| 2019/0230567 A1* | 7/2019 | Ji | H04L 67/1012 |
| 2020/0050156 A1* | 2/2020 | Moniz | G05B 15/02 |
| 2020/0067787 A1* | 2/2020 | Patra | H04L 67/12 |
| 2020/0073690 A1* | 3/2020 | Chandrashekar | H04L 41/0853 |
| 2020/0401748 A1 | 12/2020 | Betts | |
| 2021/0088494 A1* | 3/2021 | Nagar | G06Q 20/20 |
| 2021/0191342 A1* | 6/2021 | Lee | F24F 11/62 |
| 2022/0004907 A1 | 1/2022 | Hegazy | |
| 2022/0117036 A1* | 4/2022 | Moustafa | H04W 24/04 |
| 2022/0122744 A1* | 4/2022 | Zhang | G06F 16/283 |
| 2022/0164494 A1* | 5/2022 | Thompson | G01N 17/006 |
| 2022/0247584 A1* | 8/2022 | Johnson | G06F 21/53 |

OTHER PUBLICATIONS

Disclosed Anonymously, "A Method to Filter Low-Value Data in IoT Systems Using AI," IP.com, IP.com No. IPCOM000262771D, IP.com Publication Date: Jun. 29, 2020, 4 pages.

Disclosed Anonymously, "Contained device recursive sensor surrogation," IP.com, IP.com No. IPCOM000259443D, IP.com Publication Date: Aug. 12, 2019, 5 pages.

Foghorn, "The Original Edge-Native AI Platform," Accessed: Mar. 29, 2022, https://www.foghorn.io/edge-ai-platform/, 6 pages.

Lee et al., "A Study on the Fast System Recovery : Selecting the Number of Surrogate Nodes for Fast Recovery in industrial IoT Environment," IEEE, KICS-IEEE International Conference on Information and Communications with Samsung LTE & 5G Special Workshop, 2017, pp. 205-207.

Mell et al., "The NIST Definition of Cloud Computing", National Institute of Standards and Technology, Special Publication 800-145, Sep. 2011, 7 pages.

Ponnan et al., "An artificial intelligence based quorum system for the improvement of the lifespan of sensor networks," IEEE Sensors Journal, Feb. 2017, 13 pages.

Santos et al., "Maximizing the Availability of an Internet of Medical Things System using Surrogate Models and Nature-Inspired Approaches ," ResearchGate, International Journal of Grid and Utility Computing, Jan. 2020, 16 pages.

Sedjelimaci et al., A Lightweight Anomaly Detection Technique for Low-Resource IoT Devices: A Game-Theoretic Methodology, HAL—open science, Feb. 20, 2020, https://hal.archives-ouvertes.fr/hal-01460723/file/07510811.pdf, 7 pages.

Song et al., "Multi-Fidelity Local Surrogate Model for Computationally Efficient Microwave Component Design Optimization," Sensors, 2019, 19, 3023, https://mdpi-res.com/d_attachment/sensors/sensors-19-03023/article_deploy/sensors-19-03023.pdf, 13 pages.

Summerville et al., "Ultra-Lightweight Deep Packet Anomaly Detection for Internet of Things Devices," IEEE, 2015, https://www.ipccc.org/ipccc2015/Proceedings/data/polopoly_fs/1.2779109.1448299014!/fileserver/file/572351/filename/Session18_05.pdf, 8 pages.

Thangaramya et al., "Energy aware cluster and neuro-fuzzy based routing algorithm for wireless sensor networks in IoT," ScienceDirect, Computer Networks, vol. 151, Mar. 14, 2019, pp. 211-223, https://www.sciencedirect.com/science/article/abs/pii/S1389128618307771, 4 pages. (Abstract Only).

Tong et al., "Surrogate Model-Based Energy-Efficient Scheduling for LPWA-Based Environmental Monitoring Systems," IEEE Access, vol. 6, Published Oct. 18, 2018, https://ieeexplore.ieee.org/stamp/stamp.jsp?arnumber=8496752, pp. 59940-59948.

Wu et al., "Battery digital twins: Perspectives on the fusion of models, data and artificial intelligence for smart battery management systems," Elsevier, Energy and AI 1 (2020) 100016, 12 pages.

* cited by examiner

DEVICE LIFETIME-AWARE CREATION OF CUSTOMIZABLE SURROGATE-BASED MODELS

BACKGROUND

The present invention relates generally to the field of computing, and more particularly to edge computing.

Edge computing relates to a distributed information technology architecture where computing is performed on peripheral devices as opposed to centralized servers or cloud computing devices. In essence, edge computing moves storage and computing resources away from centralized facilities toward the data source itself. In this manner, edge computing may improve latency and efficiency than reliance on centralized servers, may carry security or privacy benefits, and may enable new networking paradigms that do not require internet-connected devices, or may improve efficiency of a local network. Edge computing can be used in the context of the Internet of Things (IoT) to take advantage of the computing power of a variety of local computing devices, including not only computers, servers, and mobile phones, but also appliances, vehicles, and other IoT devices. These devices may also assist in network functionality, as may be the case in a mesh wireless network.

SUMMARY

According to one embodiment, a method, computer system, and computer program product for adaptive surrogate modeling is provided. The embodiment may include capturing a plurality of system information for a smart Internet of Things (IoT) device. The embodiment may also include calculating a lifespan value of the smart IoT device based on the plurality of captured system information. The embodiment may further include, in response to the calculated lifespan value being below a threshold and a surrogate model fitting one or more parameters of the smart IoT device not existing, creating the surrogate model for the smart IoT device. The embodiment may also include deploying the created surrogate model to the smart IoT device through an update transmission.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
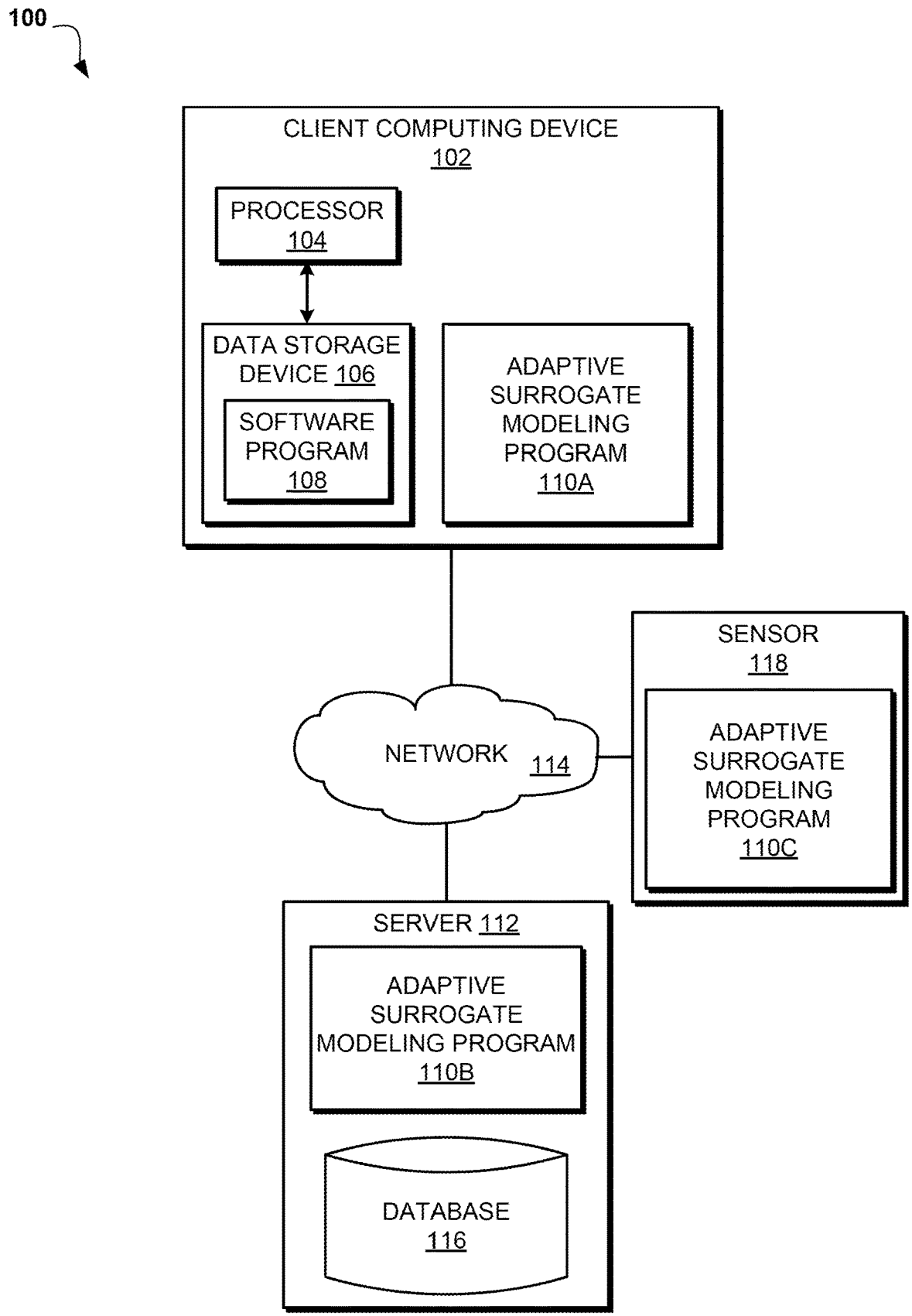
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to edge computing. The following described exemplary embodiments provide a system, method, and program product to, among other things, adaptively create surrogate models as replacements for a resource-consuming model on smart Internet of Things (IoT) devices while accounting for use case applications and a device's predicted lifespan. Therefore, the present embodiment has the capacity to improve the technical field of edge computing by maintaining leveraged data quality and insights from smart IoT devices through an improvement, or extension, of the lifespan of a device.

As previously described, edge computing relates to a distributed information technology architecture where computing is performed on peripheral devices as opposed to centralized servers or cloud computing devices. In essence, edge computing moves storage and computing resources away from centralized facilities toward the data source itself. In this manner, edge computing may improve latency and efficiency than reliance on centralized servers, may carry security or privacy benefits, and may enable new networking paradigms that do not require internet-connected devices, or may improve efficiency of a local network. Edge computing can be used in the context of the Internet of Things (IoT) to take advantage of the computing power of a variety of local computing devices, including not only computers, servers, and mobile phones, but also appliances, vehicles, and other IoT devices. These devices may also assist in network functionality, as may be the case in a mesh wireless network.

Battery lifetime, or battery lifespan, is a key aspect of devices operating in IoT or edge computing. However, current solutions attempt to overcome the problem of energy consumption by altering the wake-up frequency of devices in order to extend battery lifespan. For example, if a device is powered off or put in a rest mode, the device, theoretically, will have a longer battery lifespan as less energy will be drawn from the battery to operate the device.

With edge computing, data collection and processing is performed locally. With the popularity of low-cost sensors and smart IoT devices, deployment of sensors to external sites connected to an edge computing environment is becoming instrumental. Many of the deployed sensor devices capture valuable data regarding their surroundings (e.g., soil moisture, ground temperature, precipitation rate, etc.) and evaluate the importance of the data captured by executing algorithms, such as numerical model predictors. Additionally, these devices are becoming increasingly "smarter" as they do not merely collect the data and transmit it elsewhere for processing but are capable of processing such data themselves through models that can be based on artificial intelligence or physics-simulations. However, IoT devices and sensors deployed in the open are exposed to adverse conditions that may decrease their lifetime or drain their battery faster than usual. Such events may lead to power depletion, subsequent data loss, and reduced coverage in important areas. Furthermore, data quality can vary according to target variables, detected values of the target variables, position of the sensor, etc. Due to these aspects, a clear trade-off is observed between sensor battery lifetime and data quality.

Additionally, more computationally intensive processes tend to consume higher amounts of energy from the battery. Therefore, battery lifetime can be optimized to consider the environmental and computational burdens on embedded or communicatively coupled sensors and batteries. Since applications rely on the quality of data captured by network sensors to ensure satisfactory results, accurate data collection is imperative. As such, it may be advantageous to, among other things, create a surrogate model to perform in place of other resource-consuming models on smart IoT devices in an edge computing environment to ensure battery lifespan and data quality and integrity.

According to at least one embodiment, surrogate modeling may relate to modeling that generates the output of a system with less computation. Surrogate models may be generated by employing approximation methods to infer the relationship of input-output variables (e.g., NN) and/or by reducing the number of input parameters. Furthermore, automatic creation of surrogate models may serve as replacements for resource-consuming models on smart IoT devices based on usage of thresholds and constraints about data quality and values captured by one or more IoT devices to meeting application requirements and deployment of surrogates that take into account expected device lifetime or device battery lifetime.

In at least one embodiment, battery lifetime may relate to the total amount of time or energy held by a battery or a set of batteries under a single charge. Similarly, battery lifetime may also relate to the total number of charges a rechargeable battery may incur before the battery is unable to hold a charge above a threshold level (e.g., a threshold level of energy stored).

Many use cases may be implemented for automatic creation of surrogate models. In at least one embodiment, soil moisture sensors may be placed in a geographical location (e.g. a vineyard) where data collected by each sensor is input to a crop-growth simulation model that executes on the device itself. The data collected by the sensor may be very sensitive to the soil composition; even sensors located nearby may be likely to provide different readings due to subtle changes in the soil. In such cases, it may be crucial to ensure sensor uptime through surrogate modeling.

In another embodiment, during oil and gas production, many different types of wells may be utilized, such as production wells, injection wells, and monitoring wells. During a standard life cycle, each well type may be interchanged with another. An array of data collection may be required for each well regardless or in light of the well type, such as pressure, temperature, chemical relations, etc. However, for each type, the importance of each sensor could vary. Therefore, surrogate modeling, as described, may balance the precision of each sensor and the workload required.

In yet another embodiment, sensors that collect data during short periods of time, such as high-speed atomic experimentation, may perform experiments that produce data needing to be captured for a specific period of time. Traditional techniques that decrease the sampling rate in order to keep sensors from running out of battery life may likely be missing vital information that, through the use of surrogate modeling, may otherwise be collected by a sensor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

The following described exemplary embodiments provide a system, method, and program product to generate a surrogate model intended to replace more resource-consuming models on smart IoT devices.

Referring to FIG. 1, an exemplary networked computer environment 100 is depicted, according to at least one embodiment. The networked computer environment 100 may include client computing device 102, a server 112, and a sensor 118 interconnected via a communication network 114. According to at least one implementation, the networked computer environment 100 may include a plurality of client computing devices 102, servers 112, and sensors 118, of which only one of each is shown for illustrative brevity. Additionally, in one or more embodiments, the client computing device 102, server 112, and sensor 118 may each individually host an adaptive surrogate modeling program 110A, 110B, 110C. In one or more other embodiments, the adaptive surrogate modeling program 110A, 110B, 110C may be partially hosted on, in any combination of, the client computing device 102, the server 112, and/or the sensor 118 so that functionality may be separated between the devices.

The communication network 114 may include various types of communication networks, such as a wide area network (WAN), local area network (LAN), a telecommunication network, a wireless network, a wireless ad hoc network (i.e., a wireless mesh network), a public switched network, a radio frequency (RF) network, and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and the adaptive surrogate modeling program 110A and communicate with the server 112 and sensor 118 via the communication network 114, in accordance with one embodiment of the invention. In one or more other embodiments, client computing device 102 may be, for example, a mobile device, a smartphone, a personal digital assistant, a netbook, a laptop computer, a tablet computer, a desktop computer, or any type of computing device capable of running a program and accessing a network. As previously described, one client computing device 102 is depicted in FIG. 1 for illustrative purposes, however, any number of client computing devices 102 may be utilized. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running the adaptive surrogate modeling program 110B and a database 116 and communicating with the client computing device 102 and the sensor 118 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. In at least one embodiment, the server 112 may be deployed in an edge computing environment.

Sensor 118 may be a smart device capable of measuring data from the surrounding environment without influencing the data property being measured. Sensor 118 may include, but is not limited to, a camera, a thermometer, an anemometer, a barometer, a gyroscope, a humidistat, a pressure gauge, a light sensor, a biosensor, a neuromorphic sensor, a chemical sensor, or any device capable of capturing data and communicating with client computing device 102 and/or server 112 via network 114. In at least on embodiment, sensor 118 may be a smart IoT device capable of data collection and processing the collected data using a model. Furthermore, the sensor 118 may be capable of receiving, storing, and installing an update for the model through an update transmission from the adaptive surrogate modeling program 110A, 110B, 110C.

According to the present embodiment, the adaptive surrogate modeling program 110A, 110B, 110C may be capable of creating, selecting, and deploying surrogate models as replacements for resource-consuming models on smart IoT devices, such as sensor 118, deployed throughout an edge computing environment. The adaptive surrogate modeling program 110A, 110B, 110C may monitor and predict the lifespan of a device battery level and develop a surrogate model based on the predicted lifespan being below a threshold value. In at least one embodiment, previously created surrogate models stored in a repository, such as database 116, may be reused by the adaptive surrogate modeling program 110A, 110B, 110C if they satisfy situational criteria of the instant device. The adaptive surrogate modeling program 110A, 110B, 110C may deploy the selected surrogate model through an update message to the smart sensor, such as sensor 118, to replace the sensor's current model with the surrogate. The adaptive surrogate modeling method is explained in further detail below with respect to FIGS. 2A-2B.

Figure 2A:
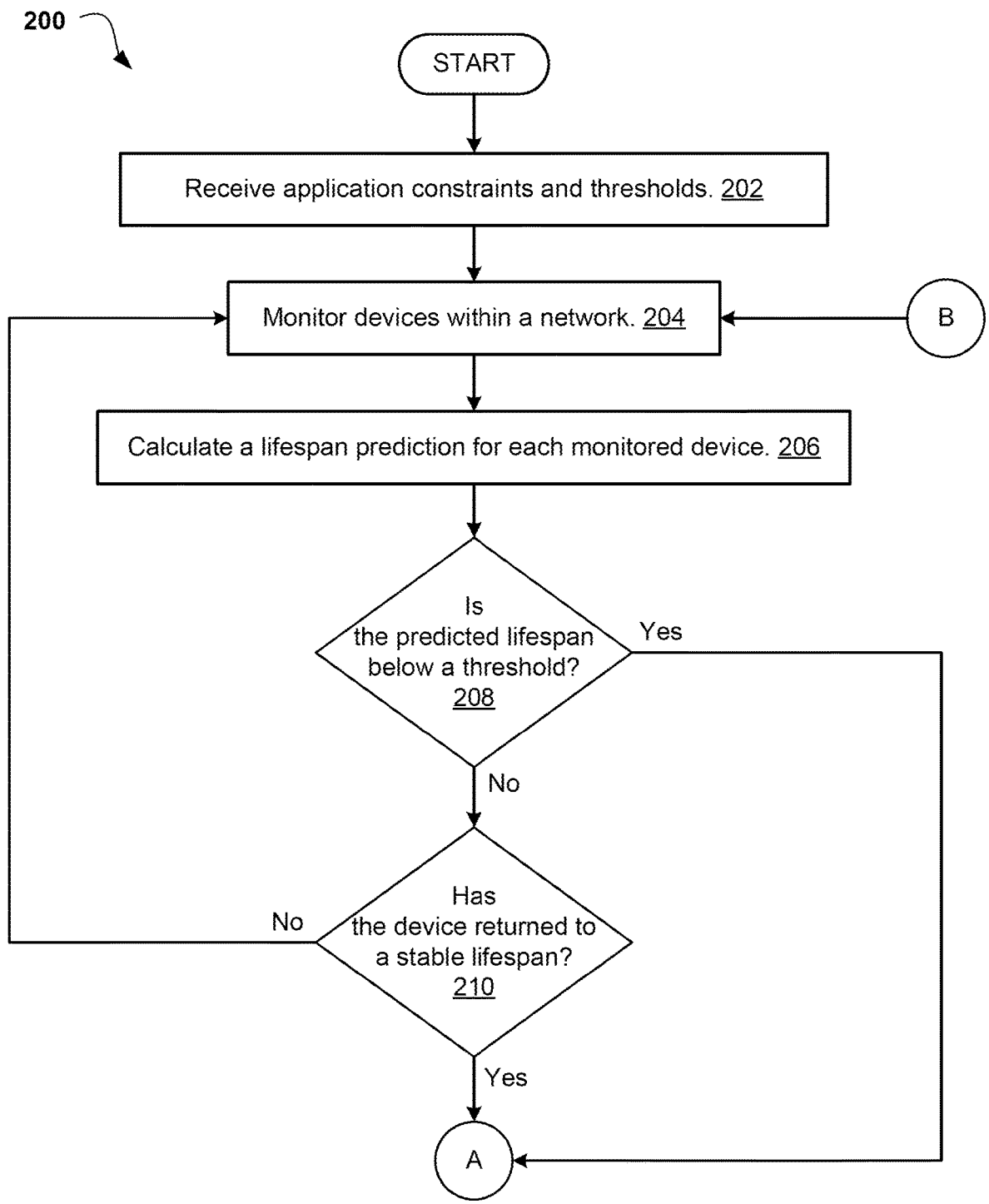
FIGS. 2A-2B illustrates an operational flowchart for an adaptive surrogate modeling process according to at least one embodiment.

Referring now to FIG. 2A, an operational flowchart for a usage history adaptive surrogate modeling process 200 is depicted according to at least one embodiment. At 202, the adaptive surrogate modeling program 110A, 110B, 110C receives application constraints and thresholds. In at least one embodiment, the thresholds may be expected values of measured variables that determine behaviors for the sensor 118 (e.g., room temperature greater than 22 degrees Celsius, humidity below 10%, etc.). In another embodiment, the constraints may be variables that should be satisfied (e.g., model accuracy above 70%, battery lifetime span of at least 2 hours, etc.). The adaptive surrogate modeling program 110A, 110B, 110C may receive application constraints and thresholds through a recurring event that occurs at preconfigured, fixed time intervals. In another embodiment, the adaptive surrogate modeling program 110A, 110B, 110C may collect the application constraints and thresholds though a single iteration triggered through a manual user interaction. The received information (i.e., the constraints and thresholds) may be pushed to a process, such as processor 104, located at the edge.

Then, at 204, the adaptive surrogate modeling program 110A, 110B, 110C monitors devices within a network. The adaptive surrogate modeling program 110A, 110B, 110C may monitor information surrounding one or more devices, such as client computing device 102 or sensor 118. The information monitored by the adaptive surrogate modeling program 110A, 110B, 110C may relate to battery power levels or other indicators suggestive of a likelihood of a device failure, system downtime status, an offline status, a network connection failure, or any other status indicative of an inoperable device. In at least one embodiment, the adaptive surrogate modeling program 110A, 110B, 110C may also monitor indicators suggestive of a device going offline at a future time, such as lack of sunlight for solar-powered devices. In another embodiment, the adaptive surrogate modeling program 110A, 110B, 110C may utilize information supplied by a third-party database, such as database 116, to receive publicly available data, such as global positioning system data and weather data.

Next, at 206, the adaptive surrogate modeling program 110A, 110B, 110C calculates a lifespan prediction for each monitored device. Utilizing the data captured from the monitored devices, the adaptive surrogate modeling program 110A, 110B, 110C may calculate a lifespan prediction for each monitored device. For example, in the previous situation where a lack of sunlight is detected in the environment surrounding a solar-powered device, the adaptive surrogate modeling program 110A, 110B, 110C may determine a period of time the lighting levels are expected to be below a threshold (e.g., time remaining until sunrise, cloudy skies clearing, etc.) and the amount of time remaining in the device's battery lifespan under current operating conditions, such as processor usage or display screen power draw. The calculation of the lifespan prediction may be performed using a linear extrapolation. Furthermore, the adaptive surrogate modeling program 110A, 110B, 110C may utilize a repository, such as database 116, to record and store the rate of battery decrease under given circumstances (e.g., surrogate model being executed, sunlight exposure for solar-power devices). The adaptive surrogate modeling program 110A, 110B, 110C may calculate the lifespan prediction as a time period or a percentage of battery remaining. In at least one embodiment, the adaptive surrogate modeling program 110A, 110B, 110C may utilize known metrics for calculating battery life when calculating the lifespan prediction for each monitored device.

Then, at 208, the adaptive surrogate modeling program 110A, 110B, 110C determines whether the predicted lifespan is below a threshold. The adaptive surrogate modeling program 110A, 110B, 110C may determine that the predicted lifespan is below a preconfigured threshold value through a comparison of the calculated lifespan to the preconfigured threshold. If the adaptive surrogate modeling program 110A, 110B, 110C determines the predicted lifespan is not below a threshold (step 208, "No" branch), then the adaptive surrogate modeling process 200 may proceed to step 210 to determine whether the device returned to a stable lifespan. If the adaptive surrogate modeling program 110A, 110B, 110C determines the predicted lifespan is below a threshold (step 208, "Yes" branch), then the adaptive surrogate modeling process 200 may precede to step 212 to verify a quality of the device.

Next, at 210, the adaptive surrogate modeling program 110A, 110B, 110C determines whether the device has returned to a stable lifespan. Some devices rely on external sources of power that may fluctuate over time and, therefore, bring a battery lifespan calculated in step 206 above the threshold discussed in step 208. For example, wind is not constant and, therefore, a wind-powered device may charge after a period of time has elapsed when wind speed has picked up. As such, the adaptive surrogate modeling program 110A, 110B, 110C may determine if the device has returned to a stable lifespan after a preconfigured period of time has elapsed. If the calculated lifespan is not below the preconfigured threshold, the adaptive surrogate modeling program 110A, 110B, 110C may determine whether the device has returned to a stable lifespan. For example, the adaptive surrogate modeling program 110A, 110B, 110C may predict, in step 206, that a device has a low lifespan based on the monitored data, however, the device battery level may return to a regular prediction level above the threshold determined in step 208. Therefore, a surrogate model may not be necessary when the battery level of the device remains above the threshold. If the adaptive surrogate modeling program 110A, 110B, 110C determines the device has returned to a stable lifespan (step 210, "Yes" branch), then the surrogate modeling process 200 may proceed to step 212 to verify a quality of the device. If the adaptive surrogate modeling program 110A, 110B, 110C determines the device has not returned to a stable lifespan (step 210, "No" branch), then the surrogate modeling process 200 may return to step 204 to monitor devices within the network.

Figure 2B:
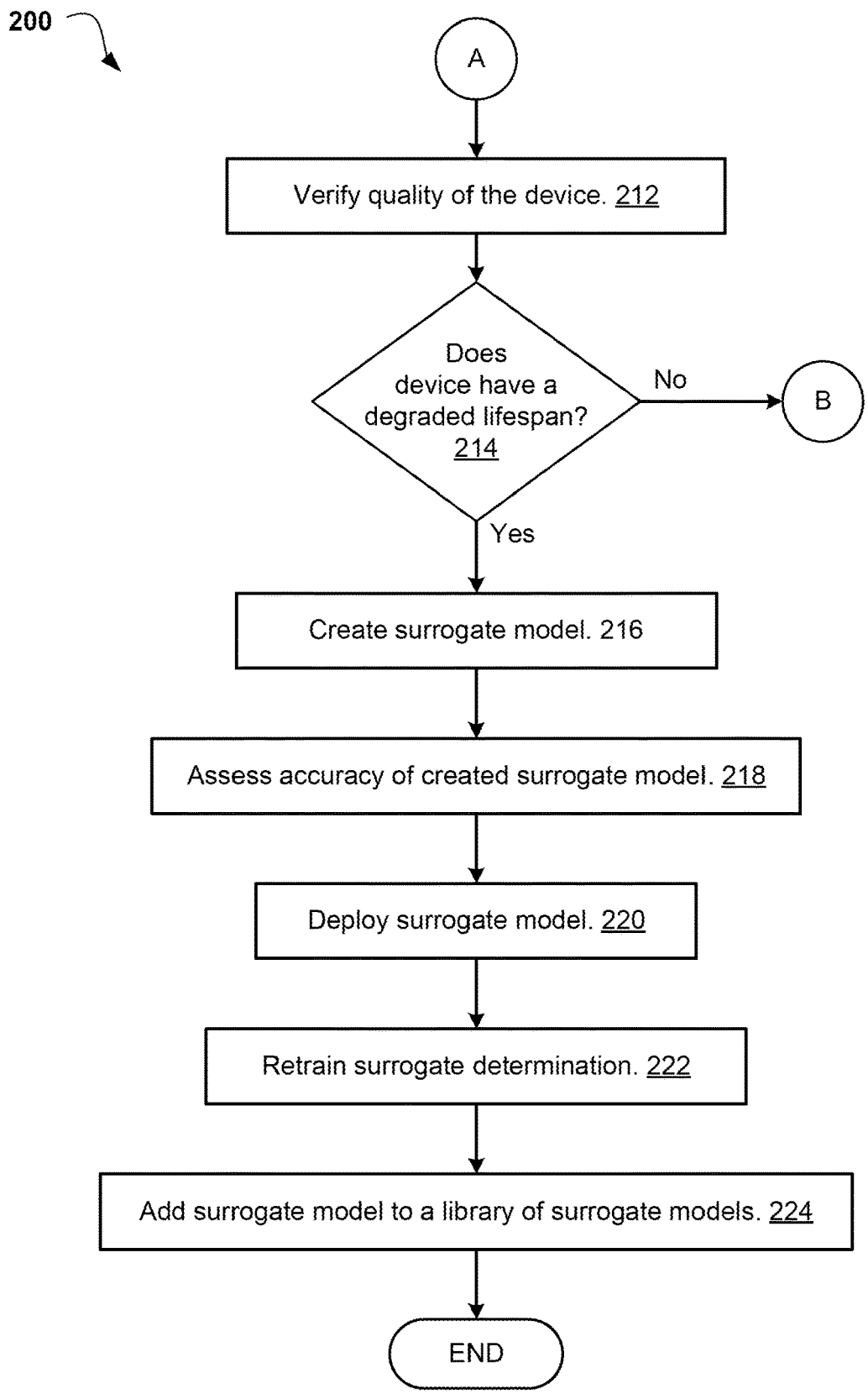

Referring now to FIG. 2B, at 212, the adaptive surrogate modeling program 110A, 110B, 110C verifies a quality of the device. In situations where either the predicted lifespan is below the preconfigured threshold or the device has returned to a stable lifespan, the adaptive surrogate modeling program 110A, 110B, 110C may verify the information received from the one or more sensors 118 to ensure the quality of the device. For example, if a sensor, such as sensor 118, is powered by solar energy and sunlight is blocked by dense clouds, the adaptive surrogate modeling program 110A, 110B, 110C may collect data from the nearest weather radar to verify that the dense clouds are indeed the cause of low power to the device, which may be temporary, rather than a malfunction with the device itself. As indicated in the above example, the adaptive surrogate modeling program 110A, 110B, 110C may receive supplemental data to verify the quality of the device from external sources that are not the one or more sensors. For example, a weather radar from the previous example relating to a solar-powered sensor. The external sources from which the adaptive surrogate modeling program 110A, 110B, 110C receive the supplemental data may be any repository, such as database 116, accessible by the adaptive surrogate modeling program 110A, 110B, 110C. In at least one embodiment, the adaptive surrogate modeling program 110A, 110B, 110C may be configured to obtain the supplemental information from the external sources through an application programming interface. Furthermore, the adaptive surrogate modeling program 110A, 110B, 110C may utilize a variety of known technologies either alone or in tandem to process information necessary for a verification of the quality of the device. For example, in the previous example, the adaptive surrogate modeling program 110A, 110B, 110C may utilize image recognition technology to determine not enough light is present to properly power a solar-powered sensor and natural language processing of weather data to determine when adequate sunlight may return.

Then, at 214, the adaptive surrogate modeling program 110A, 110B, 110C determines whether a device has a degraded lifespan. The adaptive surrogate modeling program 110A, 110B, 110C may determine that the device has a degraded lifespan when the supplemental information used to verify the quality of the device indicates that an issue is present in the device. For example, if the supplemental information indicates that clear skies are present, but a solar-powered sensor has a predicted lifespan below the preconfigured threshold, then the adaptive surrogate modeling program 110A, 110B, 110C may determine that an issue is present with the device and, therefore, the device has a degraded lifespan. If the adaptive surrogate modeling program 110A, 110B, 110C determines the device has a degraded lifespan (step 214, "Yes" branch), then the adaptive surrogate modeling process 200 may proceed to step 216 to create a surrogate model. If the adaptive surrogate modeling program 110A, 110B, 110C determines the device does not have a degraded lifespan (step 214, "No" branch), then the adaptive surrogate modeling process 200 may return to step 204 to monitor devices within the network.

Next, at 216, the adaptive surrogate modeling program 110A, 110B, 110C creates a surrogate model. Once the adaptive surrogate modeling program 110A, 110B, 110C determines that a device has a degraded lifespan, the adaptive surrogate modeling program 110A, 110B, 110C may proceed with creating a surrogate model to extend the predicted lifespan. When creating the surrogate model, the adaptive surrogate modeling program 110A, 110B, 110C may consider the application threshold provided by the sensor 118, whether the device is going to operate under constraints for a limited period of time, and any additional criteria considerations either necessary or user-preferred for operation. For example, special dates (e.g., holidays) might require different criteria; weather-related The process of creating a surrogate model depends on the technique adopted, such as linear or non-linear regression Gaussian process. The adaptive surrogate modeling program 110A, 110B, 110C may utilize a knowledge base to describe what hyperparameters of the surrogate model should be optimized and what should be the objective function to properly assess model performance for calibration. For example, if the selected technique is a neural network, one of the hyperparameters of the surrogate model to be optimized should be the learning rate. Additionally, the knowledge base may provide information regarding the expected power consumption of each technique utilized.

In at least one embodiment, the adaptive surrogate modeling program 110A, 110B, 110C may access a repository, such as database 116, that contains a library of existing surrogate models. The adaptive surrogate modeling program 110A, 110B, 110C may be capable of searching the library for existing surrogate models that fit the criteria needed to successfully operate on the instant device. The criteria stored in the library may include, but is not limited to, device type, device model, device serial number, device components, device processing power, device battery draw, surrogate model accuracy, computational resource consumption rate, etc.

In at least one embodiment, the process of selecting an existing surrogate model that is most adequate for a specific use case can be performed by known solver techniques of a constraint satisfaction problem (e.g., linear programming). Exemplary constraints may be modeled as:

Being x the variable measure, if x>threshold:
ModelAccuracy> and BatteryTime>t;
ModelAccuracy=R2(ModelOutput, ReadData);
BatteryTime=y*model_consumption+model_deployment_consumption.

Then, at 218, the adaptive surrogate modeling program 110A, 110B, 110C assesses the accuracy of the created surrogate model. Once the surrogate model has been generated or selected from the library of existing surrogate models, the adaptive surrogate modeling program 110A, 110B, 110C may assess the accuracy of the surrogate model. The assessment of the surrogate model may determine whether utilization of the surrogate model provides a more efficient usage of the device's battery and extends the battery lifespan better than the current model utilized by the device. The adaptive surrogate modeling program 110A, 110B, 110C may perform the accuracy assessment through modeling output predictions from the surrogate model and comparing the surrogate model output predictions to the original output of the device. If the surrogate model produces a better prediction as to the battery lifespan of the device, the adaptive surrogate modeling program 110A, 110B, 110C may determine that the surrogate model provides an advantage over the original model for the device.

In at least one embodiment, the adaptive surrogate modeling program 110A, 110B, 110C may determine that the surrogate model does not produce a better prediction as to the lifespan of the device battery lifespan. As such, if the surrogate model does not produce an assessment that is more advantageous than the original model, the adaptive surrogate modeling program 110A, 110B, 110C may alter the settings used to create the surrogate model and then generate a new surrogate model or return to step 204 to monitor devices in the network since, under such circumstances, the original model may be the most efficient model for maximizing the length of the device battery lifespan.

Next, at 220, the adaptive surrogate modeling program 110A, 110B, 110C deploys the surrogate model. Once the accuracy of the surrogate model is assessed and verified, the adaptive surrogate modeling program 110A, 110B, 110C may deploy the surrogate model to replace the original, or current, model within the device. The surrogate model may be deployed to the device as an update message to the smart device, such as sensor 118, to initiate the replacement of the current model with the surrogate model. Once the update to the surrogate model is complete to the device, the adaptive surrogate modeling program 110A, 110B, 110C may collect new elements of data from the surrounding environment and process those collected data elements using the newly installed surrogate model.

Then, at 222, the adaptive surrogate modeling program 110A, 110B, 110C retrains the surrogate determination. The adaptive surrogate modeling program 110A, 110B, 110C may utilize a feedback-based learning process for surrogate determination. As such, the adaptive surrogate modeling program 110A, 110B, 110C may determine if the surrogate is providing data with the required accuracy and if the device battery lifespan has indeed improved to a threshold extent that is consistent with the assessment performed in step 218. The adaptive surrogate modeling program 110A, 110B, 110C may collect information relevant to device and battery performance and record the information in a repository, such as database 116. The adaptive surrogate modeling program 110A, 110B, 110C may utilize the recorded information to further improve selection of existing surrogate models in future iterations when the adaptive surrogate modeling program 110A, 110B, 110C attempts to select a surrogate model from the library as described in step 216.

Next, at 224, the adaptive surrogate modeling program 110A, 110B, 110C adds the surrogate model to a library of surrogate models. Once the adaptive surrogate modeling program 110A, 110B, 110C has generated and deployed the surrogate model, the adaptive surrogate modeling program 110A, 110B, 110C may store the surrogate model in the library of existing surrogate models stored in a repository, such as database 116. This storage may allow the adaptive surrogate modeling program 110A, 110B, 110C to utilize the surrogate model created for a specific iteration, and that did not previously exist, in future iterations that fit similar or the same use case criteria. For example, to continue the earlier example, if the adaptive surrogate modeling program 110A, 110B, 110C created a surrogate model for a solar-powered sensor due to a similar model not existing in the library of existing surrogate models, the adaptive surrogate modeling program 110A, 110B, 110C may store the newly created surrogate model in the library for use should a surrogate model for another solar-powered sensor with similar criteria be needed in the future.

It may be appreciated that FIGS. 2A and 2B provide only an illustration of one implementation and do not imply any limitations with regard to how different embodiments may be implemented. Many modifications to the depicted environments may be made based on design and implementation requirements.

Figure 3:
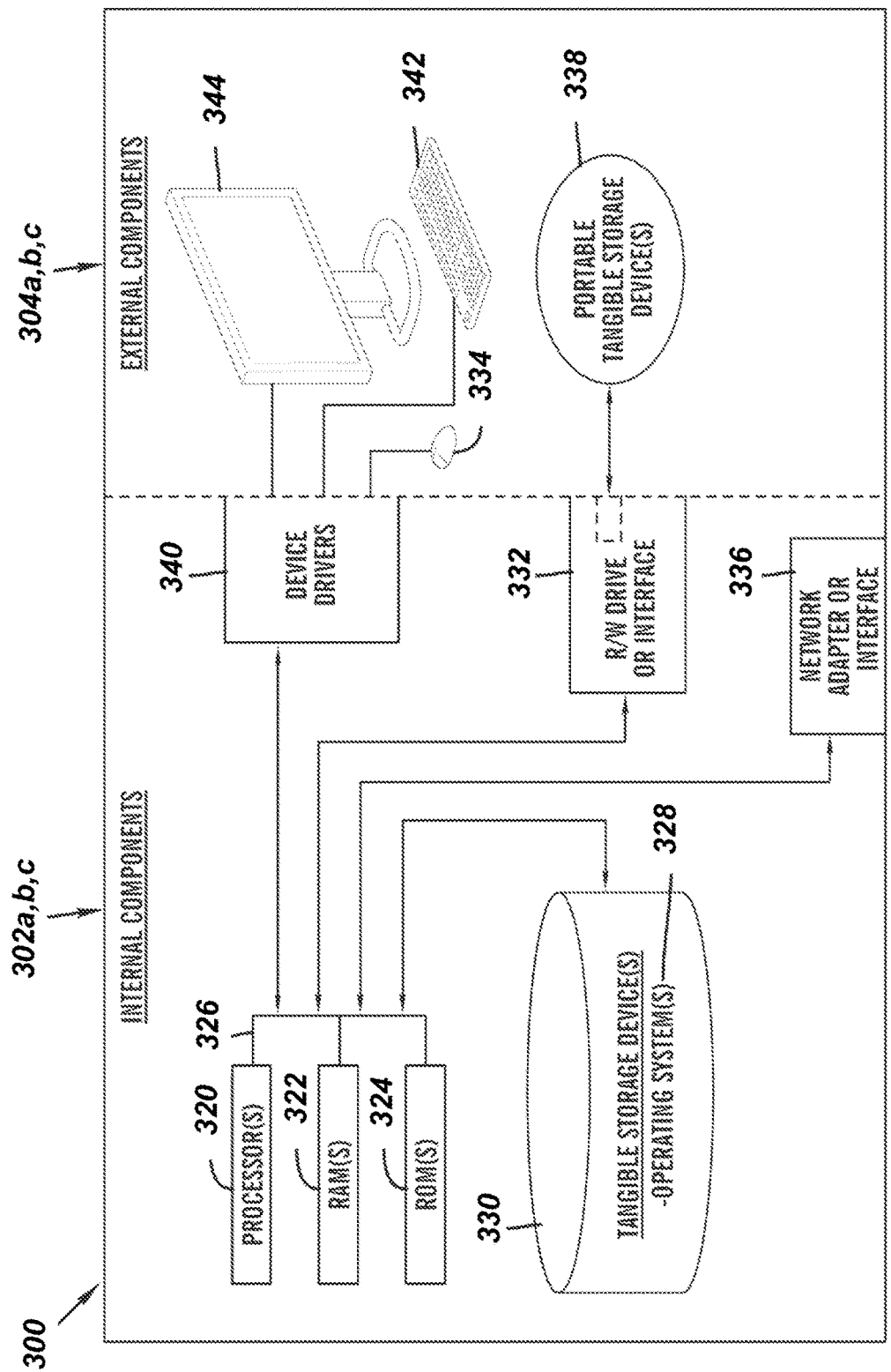
FIG. 3 is a block diagram of internal and external components of computers and servers depicted in FIG. 1 according to at least one embodiment.

FIG. 3 is a block diagram 300 of internal and external components of the client computing device 102, the server 112, and the sensor 118 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the server 112, and the sensor 118 may include respective sets of internal components 302a,b,c and external components 304a,b,c illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the adaptive surrogate modeling program 110A in the client computing device 102, the adaptive surrogate modeling program 110B in the server 112, and the adaptive surrogate modeling program 110C in the sensor 118 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b,c also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the adaptive surrogate modeling program 110A, 110B, 110C, can be stored on one or more of the respective portable computer-readable tangible storage devices 338, read via the respective R/W drive or interface 332, and loaded into the respective hard drive 330.

Each set of internal components 302a,b,c also includes network adapters or interfaces 336 such as a TCP/IP adapter cards, wireless Wi-Fi interface cards, or 3G, 4G, or 5G wireless interface cards or other wired or wireless communication links. The software program 108 and the adaptive surrogate modeling program 110A in the client computing device 102, the adaptive surrogate modeling program 110B in the server 112, and the adaptive surrogate modeling program 110C in the sensor 118 can be downloaded to the client computing device 102, the server 112, and the sensor 118 from an external computer via a network (for example, the Internet, a local area network or other, wide area network) and respective network adapters or interfaces 336. From the network adapters or interfaces 336, the software program 108 and the adaptive surrogate modeling program 110A in the client computing device 102, the adaptive surrogate modeling program 110B in the server 112, and the adaptive surrogate modeling program in the sensor 118 are loaded into the respective hard drive 330. The network may comprise copper wires, optical fibers, wireless transmission, routers, firewalls, switches, gateway computers and/or edge servers.

Each of the sets of external components 304a,b,c can include a computer display monitor 344, a keyboard 342, and a computer mouse 334. External components 304a,b,c can also include touch screens, virtual keyboards, touch pads, pointing devices, and other human interface devices. Each of the sets of internal components 302a,b,c also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
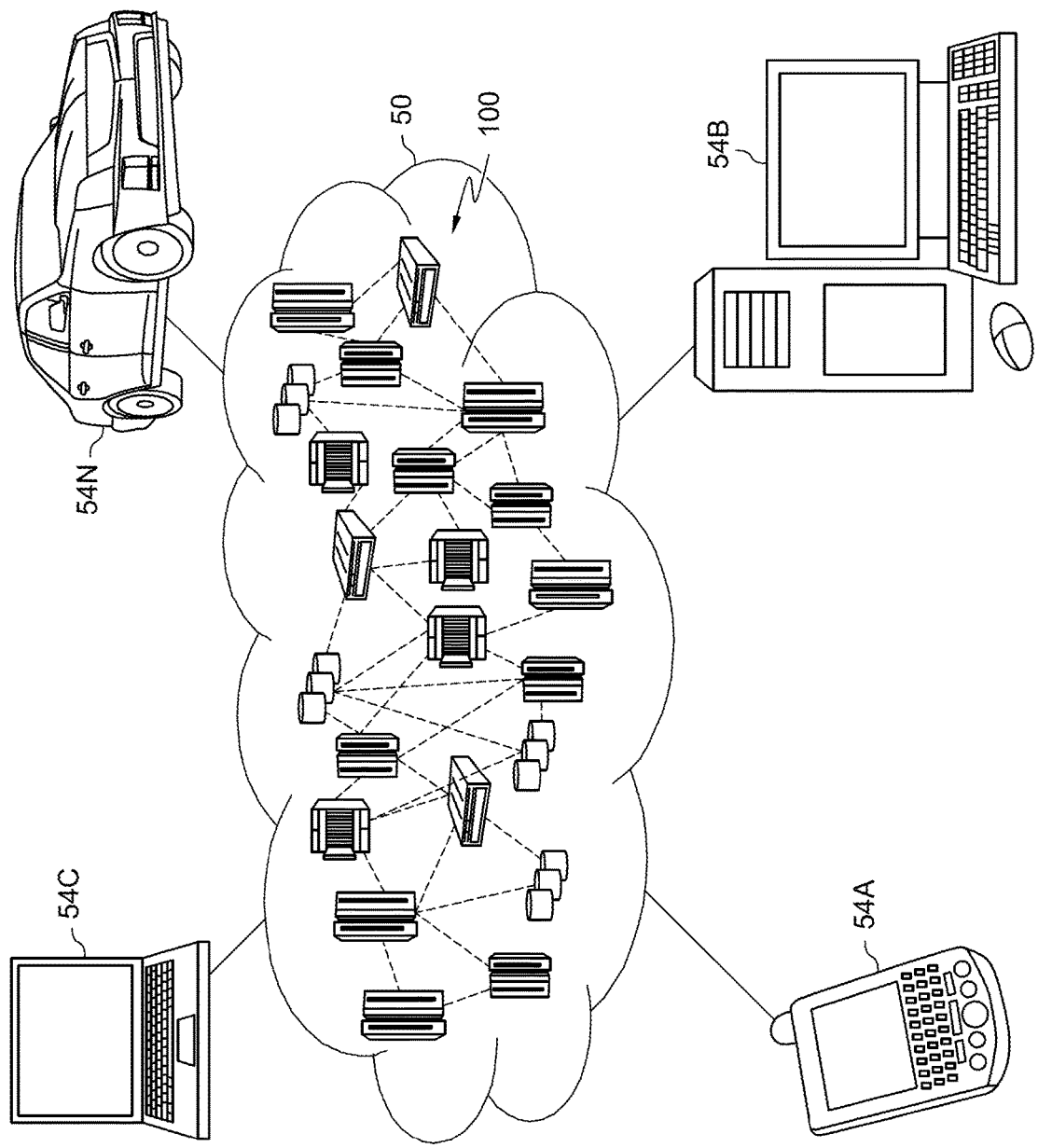
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
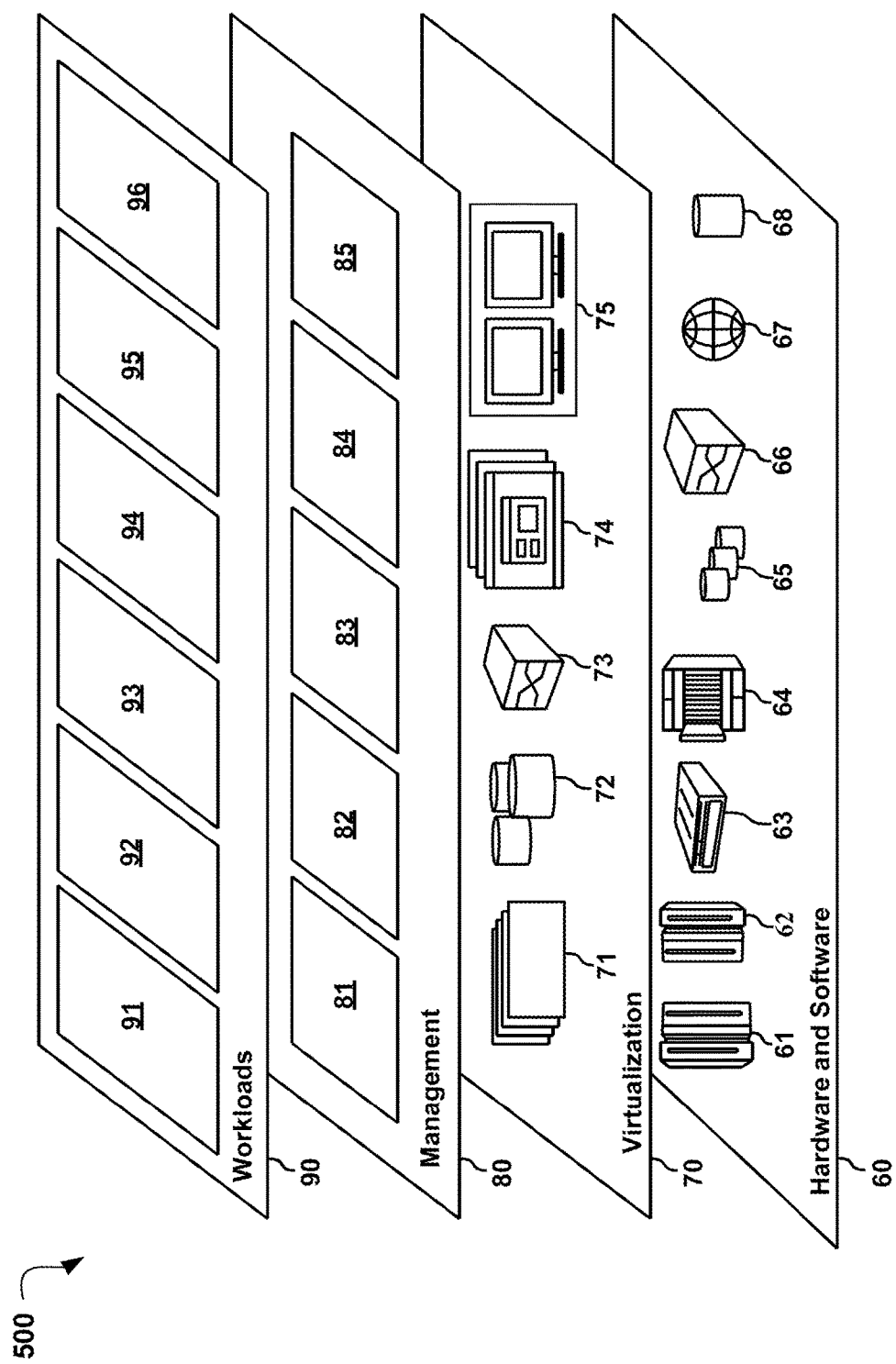
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive surrogate-based modeling 96. Adaptive surrogate-based modeling 96 may relate to adaptively creating more resource-efficient surrogate models as a replacement for more resource-consuming models on smart IoT devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   capturing, by a processor, a plurality of system information for a smart Internet of Things (IoT) device;
   calculating a lifespan value of the smart IoT device using linear extrapolation based on the plurality of captured system information;
   in response to the calculated lifespan value being below a threshold, determining whether a surrogate model fitting one or more parameters of the smart IoT device is present in a library of a plurality of existing surrogate models; and
   in response to determining the surrogate model is present in the library, selecting the surrogate model for deployment to the smart IoT device;
   in response to the calculated lifespan value being below a threshold and a surrogate model fitting one or more parameters of the smart IoT device not existing, creating the surrogate model for the smart IoT device, wherein the surrogate model is optimized using hyperparameters described in a knowledge base; and
   deploying the created surrogate model to the smart IoT device through an update transmission.

2. The method of claim 1, further comprising:
   verifying accuracy of the created surrogate model based on comparing output data of the created surrogate model to output data of the original model on the smart IoT device.

3. The method of claim 1, further comprising:
   monitoring the smart IoT device for a preconfigured period of time;
   calculating a second lifespan value of the smart IoT device after the preconfigured period of time; and
   in response to the calculated second lifespan being above a threshold value greater than the calculated lifespan, determining a quality of the smart IoT device.

4. The method of claim 1, further comprising:
   storing the deployed surrogate model to a library of existing surrogate models in a repository.

5. The method of claim 1, further comprising:
retraining the surrogate model through a feedback-based learning process of surrogate determination based on information relevant to device and battery performance of the smart IoT device collected after deployment of the surrogate model to the smart IoT device.

6. The method of claim 1, wherein the plurality of system information comprises a plurality of application constraints and a plurality of application thresholds.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
capturing a plurality of system information for a smart Internet of Things (IoT) device;
calculating a lifespan value of the smart IoT device using linear extrapolation based on the plurality of captured system information;
in response to the calculated lifespan value being below a threshold, determining whether a surrogate model fitting one or more parameters of the smart IoT device is present in a library of a plurality of existing surrogate models; and
in response to determining the surrogate model is present in the library, selecting the surrogate model for deployment to the smart IoT device;
in response to the calculated lifespan value being below a threshold and a surrogate model fitting one or more parameters of the smart IoT device not existing, creating the surrogate model for the smart IoT device, wherein the surrogate model is optimized using hyperparameters described in a knowledge base; and
deploying the created surrogate model to the smart IoT device through an update transmission.

8. The computer system of claim 7, further comprising:
verifying accuracy of the created surrogate model based on comparing output data of the created surrogate model to output data of the original model on the smart IoT device.

9. The computer system of claim 7, further comprising:
monitoring the smart IoT device for a preconfigured period of time;
calculating a second lifespan value of the smart IoT device after the preconfigured period of time; and
in response to the calculated second lifespan being above a threshold value greater than the calculated lifespan, determining a quality of the smart IoT device.

10. The computer system of claim 7, further comprising:
storing the deployed surrogate model to a library of existing surrogate models in a repository.

11. The computer system of claim 7, further comprising:
retraining the surrogate model through a feedback-based learning process of surrogate determination based on information relevant to device and battery performance of the smart IoT device collected after deployment of the surrogate model to the smart IoT device.

12. The computer system of claim 7, wherein the plurality of system information comprises a plurality of application constraints and a plurality of application thresholds.

13. A computer program product, the computer program product comprising:
one or more computer-readable tangible storage medium and program instructions stored on at least one of the one or more tangible storage medium, the program instructions executable by a processor capable of performing a method, the method comprising:
capturing a plurality of system information for a smart Internet of Things (IoT) device;
calculating a lifespan value of the smart IoT device using linear extrapolation based on the plurality of captured system information;
in response to the calculated lifespan value being below a threshold, determining whether a surrogate model fitting one or more parameters of the smart IoT device is present in a library of a plurality of existing surrogate models; and
in response to determining the surrogate model is present in the library, selecting the surrogate model for deployment to the smart IoT device;
in response to the calculated lifespan value being below a threshold and a surrogate model fitting one or more parameters of the smart IoT device not existing, creating the surrogate model for the smart IoT device, wherein the surrogate model is optimized using hyperparameters described in a knowledge base; and
deploying the created surrogate model to the smart IoT device through an update transmission.

14. The computer program product of claim 13, further comprising:
verifying accuracy of the created surrogate model based on comparing output data of the created surrogate model to output data of the original model on the smart IoT device.

15. The computer program product of claim 13, further comprising:
monitoring the smart IoT device for a preconfigured period of time;
calculating a second lifespan value of the smart IoT device after the preconfigured period of time; and
in response to the calculated second lifespan being above a threshold value greater than the calculated lifespan, determining a quality of the smart IoT device.

16. The computer program product of claim 13, further comprising:
storing the deployed surrogate model to a library of existing surrogate models in a repository.

17. The computer program product of claim 13, further comprising:
retraining the surrogate model through a feedback-based learning process of surrogate determination based on information relevant to device and battery performance of the smart IoT device collected after deployment of the surrogate model to the smart IoT device.

* * * * *